(12) United States Patent
Oto (10) Patent No.: US 10,215,867 B2
(45) Date of Patent: Feb. 26, 2019

(54) VIBRATION ANALYZING SYSTEM, VIBRATION ANALYZING APPARATUS, AND VIBRATION ANALYZING METHOD

(71) Applicant: Seiko Epson Corporation, Tokyo (JP)

(72) Inventor: Masayuki Oto, Okaya (JP)

(73) Assignee: Seiko Epson Corporation (JP)

(*) Notice: Subject to any disclaimer, the term of this patent is extended or adjusted under 35 U.S.C. 154(b) by 234 days.

(21) Appl. No.: 15/384,693

(22) Filed: Dec. 20, 2016

(65) Prior Publication Data
US 2017/0184741 A1    Jun. 29, 2017

(30) Foreign Application Priority Data

Dec. 28, 2015  (JP) .................. 2015-256062

(51) Int. Cl.
*G01V 1/30*  (2006.01)
*G01V 1/00*  (2006.01)

(52) U.S. Cl.
CPC ............... *G01V 1/008* (2013.01); *G01V 1/30* (2013.01)

(58) Field of Classification Search
CPC .................................. G01V 1/008; G01V 1/30
USPC ................................................ 73/579
See application file for complete search history.

(56) References Cited

U.S. PATENT DOCUMENTS

| | | | | |
|---|---|---|---|---|
| 6,356,204 B1 * | 3/2002 | Guindi | ............... | G01V 1/008 340/665 |
| 7,005,993 B2 * | 2/2006 | Webb | ............... | G01V 1/008 340/601 |
| 7,069,158 B2 * | 6/2006 | Gidwani | ............... | G01V 1/008 52/167.4 |
| 7,598,884 B2 * | 10/2009 | Lachenit | ............... | G08B 21/10 340/286.02 |
| 7,905,329 B2 * | 3/2011 | Urata | ............... | B66B 5/022 187/278 |
| 9,222,276 B2 * | 12/2015 | Stenswick | ............... | E04H 9/021 |
| 9,366,770 B2 * | 6/2016 | Kachi | ............... | G01V 1/008 |

FOREIGN PATENT DOCUMENTS

| JP | 2005-128938 A | 5/2005 |
|---|---|---|
| JP | 2008-298704 A | 12/2008 |
| JP | 2011-084877 A | 4/2011 |
| JP | 2012-018069 A | 1/2012 |

* cited by examiner

Primary Examiner — J M Saint Surin
(74) Attorney, Agent, or Firm — Harness, Dickey & Pierce, P.L.C.

(57) ABSTRACT

A vibration analyzing apparatus includes a vibration detecting unit set in a building where a person can reside and configured to detect vibration and output a detection signal based on the detected vibration, a mode determining unit configured to determine presence or absence of vibration of the building caused by an earthquake, and a control unit including a vibration analyzing unit configured to analyze the vibration on the basis of the detection signal, the control unit setting an analysis mode of the vibration analyzing unit. The control unit sets one of a normal time analysis mode for causing the vibration analyzing unit to analyze a vibration waveform indicated by the detection signal on the basis of a first condition and obtaining information concerning residence of the person and an earthquake analysis mode for obtaining information concerning deformation of the building.

14 Claims, 7 Drawing Sheets

VIBRATION ANALYZING SYSTEM, VIBRATION ANALYZING APPARATUS, AND VIBRATION ANALYZING METHOD

BACKGROUND

1. Technical Field

The present invention relates to a vibration analyzing system, a vibration analyzing apparatus, and a vibration analyzing method.

2. Related Art

There has been proposed a system that, when an earthquake occurs, diagnoses damage to a building due to quakes and reports a disaster situation via a network. For example, JP-A-2008-298704 (Patent Literature 1) proposes a building monitoring system that calculates a deformation amount of a building due to an earthquake from information concerning the earthquake and structure data of the building and prioritizes and notifies a disaster situation of the building according to the calculated deformation amount.

As a system that monitors and analyzes life activities of a resident of a building, for example, a life monitoring system disclosed in JP-A-2005-128938 (Patent Literature 2) has been proposed. The monitoring system is configured to detect life activities of the resident from a sensor set on a floor surface of the building and output a signal to the outside according to the detected life activities.

When a large earthquake occurs, a disaster situation of the building can be detected by the building monitoring system. However, the building monitoring system cannot detect a disaster situation of the resident. The life monitoring system can detect life activities of the resident. However, the life monitoring system cannot detect, for example, a situation in which the resident is confined in the building because of the large earthquake and cannot take refuge outside. If hands and feet move in a space where the resident is confined, the life monitoring system sometimes erroneously determines that the resident lives without a problem. Therefore, the building monitoring system and the life monitoring system need to be associated to determine a disaster situation of the resident when an earthquake occurs. The disaster situation cannot be quickly grasped.

SUMMARY

An advantage of some aspects of the invention is to quickly analyze an activity situation of a resident and a disaster situation of people during an earthquake.

The invention can be implemented as the following forms or application examples.

Application Example 1

A vibration analyzing system according to this application example includes: a vibration detecting unit set in a building where a person can reside and configured to detect vibration and output a detection signal based on the detected vibration; an earthquake-vibration determining unit configured to determine presence or absence of vibration of the building caused by an earthquake; and a control unit including an analyzing unit configured to analyze the vibration on the basis of the detection signal, the control unit setting an analysis mode of the analyzing unit. The control unit sets one analysis mode on the basis of the presence or absence of the vibration due to the earthquake determined by the earthquake-vibration determining unit from a plurality of analysis modes including a first analysis mode for causing the analyzing unit to analyze a vibration waveform indicated by the detection signal on the basis of a first condition and obtaining information concerning residence of the person and a second analysis mode for causing the analyzing unit to analyze the vibration waveform and obtaining information concerning deformation of the building.

With such a configuration, the vibration detecting unit detects vibration and the control unit switches, according to earthquake information acquired by an earthquake-information acquiring unit, the first analysis mode for analyzing the vibration waveform indicated by the detection signal based on the detected vibration and the second analysis mode for analyzing an earthquake waveform included in the vibration waveform and analyzes the vibration. Therefore, it is possible to switch and analyze a vibration waveform caused by an activity or the like of the person and an earthquake waveform due to the earthquake. Therefore, it is possible to quickly analyze disaster situations of the person and the like due to the earthquake.

Application Example 2

In the vibration analyzing system according to the application example, it is preferable that the vibration analyzing system further includes an earthquake-information acquiring unit configured to acquire earthquake information concerning the earthquake, and the earthquake-vibration determining unit determines presence or absence of earthquake vibration on the basis of the earth information.

With such a configuration, it is possible to acquire the earthquake information concerning the earthquake from the earthquake-information acquiring unit and determine presence or absence of the earthquake vibration on the basis of the earthquake information.

Application Example 3

In the vibration analyzing system according to the application example, it is preferable that the control unit sets the second analysis mode when the earthquake information is acquired.

With such a configuration, since the second analysis mode is set when the earthquake information is acquired, when an earthquake occurs, it is possible to perform an analysis of an earthquake waveform due to the earthquake.

Application Example 4

In the vibration analyzing system according to the application example, it is preferable that, in the first analysis mode, at least one of abnormality of the building and abnormality of the person residing in the building is detected on the basis of the analysis of the vibration waveform.

With such a configuration, it is possible to detect abnormality of the building and abnormality of the resident of the building at normal time.

Application Example 5

In the vibration analyzing system according to the application example, it is preferable that, in the second analysis mode, deterioration in structure of the building is detected on the basis of the analysis of the vibration waveform.

With such a configuration, it is possible to detect abnormality of the building when an earthquake occurs.

Application Example 6

In the vibration analyzing system according to the application example, it is preferable that, after setting the second analysis mode, the control unit causes the analyzing unit to analyze the vibration waveform on the basis of a second condition and sets a third analysis mode for detecting at least one of abnormality of the building, deterioration in structure of the building, and abnormality of the person residing in the building.

With such a configuration, it is possible to detect abnormality of the building and abnormality of the resident on the basis of the second condition after an earthquake occurs.

Application Example 7

In the vibration analyzing system according to the application example, it is preferable that the vibration analyzing system further includes an informing unit configured to inform the abnormality of the building and the abnormality of the person residing in the building detected by the analyzing unit.

With such a configuration, it is possible to inform, with the informing unit, the abnormality of the building and the abnormality of the person residing in the building.

Application Example 8

In the vibration analyzing system according to the application example, it is preferable that the vibration analyzing system further includes an informing unit configured to inform the deterioration in the structure of the building detected by the analyzing unit.

With such a configuration, it is possible to inform, with the informing unit, the deterioration in the structure of the building detected by the analyzing unit.

Application Example 9

In the vibration analyzing system according to the application example, it is preferable that, in the first analysis mode, the vibration waveform is analyzed at a predetermined time interval.

Application Example 10

In the vibration analyzing system according to the application example, it is preferable that the vibration analyzing system further includes a storing unit configured to store an analysis result concerning the vibration, the analyzing unit analyzes, in the first analysis mode, a first eigenfrequency of the building on the basis of the vibration waveform and stores the analyzed first eigenfrequency in the storing unit and analyzes, in the third analysis mode, a second eigenfrequency of the building on the basis of the vibration waveform, compares the analyzed second eigenfrequency and the first eigenfrequency stored in the storing unit, and detects deterioration in structure of the building.

With such a configuration, it is possible to detect the deterioration in the structure of the building by comparing eigenfrequencies before and after the earthquake.

Application Example 11

In the vibration analyzing system according to the application example, it is preferable that the vibration analyzing system includes a plurality of the vibration detecting units, and the control unit causes the analyzing unit to analyze the detection signals respectively output by the plurality of vibration detecting units and determines erroneous detection of the vibration on the basis of a plurality of the analysis results.

With such a configuration, since the detection signals respectively output by the plurality of vibration detecting units are analyzed, it is possible to suppress erroneous determination due to erroneous detection by the vibration detecting unit.

Application Example 12

In the vibration analyzing system according to the application example, it is preferable that the control unit calculates an average of the plurality of analysis results and determines occurrence of abnormality due to the vibration on the basis of the calculated average.

With such a configuration, since the average of the plurality of analysis results is calculated and the occurrence of the abnormality due to the vibration is determined on the basis of the calculated average, it is possible to improve determination accuracy.

Application Example 13

A vibration analyzing apparatus according to this application example including: a vibration detecting unit set in a building where a person can reside and configured to detect vibration and output a detection signal based on the detected vibration; an earthquake-vibration determining unit configured to determine presence or absence of vibration of the building caused by an earthquake; and a control unit including an analyzing unit configured to analyze the vibration on the basis of the detection signal, the control unit setting an analysis mode of the analyzing unit. The control unit sets one analysis mode on the basis of the presence or absence of the vibration due to the earthquake determined by the earthquake-vibration determining unit from a plurality of analysis modes including a first analysis mode for causing the analyzing unit to analyze a vibration waveform indicated by the detection signal on the basis of a first condition and obtaining information concerning residence of the person and a second analysis mode for causing the analyzing unit to analyze the vibration waveform and obtaining information concerning deformation of the building.

With such a configuration, the vibration detecting unit detects vibration and the control unit switches, according to earthquake information acquired by an earthquake-information acquiring unit, the first analysis mode for analyzing the vibration waveform indicated by the detection signal based on the detected vibration and the second analysis mode for analyzing an earthquake waveform included in the vibration waveform and analyzes the vibration. Therefore, it is possible to switch and analyze a vibration waveform caused by an activity or the like of the person and an earthquake waveform due to the earthquake. Therefore, it is possible to quickly analyze disaster situations of the person and the like due to the earthquake.

Application Example 14

A vibration analyzing method according to an application example includes: detecting vibration of a building, where a person can reside, and outputting a detection signal based on the detected vibration; determining presence or absence of vibration of the building caused by an earthquake; and setting one analysis mode on the basis of the presence or absence of the vibration due to the earthquake from a plurality of analysis modes including a first analysis mode for analyzing a vibration waveform indicated by the detection signal on the basis of a first condition and obtaining information concerning residence of the person and a second analysis mode for analyzing the vibration waveform and obtaining information concerning deformation of the building.

With such a method, vibration is detected and the first analysis mode for analyzing the vibration waveform indicated by the detection signal based on the detected vibration and the second analysis mode for analyzing an earthquake waveform included in the vibration waveform are switched according to acquired earthquake information and the vibration is analyzed. Therefore, it is possible to switch and analyze a vibration waveform caused by an activity or the like of the person and an earthquake waveform due to the earthquake. Therefore, it is possible to quickly analyze disaster situations of the person and the like due to the earthquake.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained below with reference to the drawings.

Embodiment

A vibration analyzing system according to an embodiment is explained below with reference to the drawings.

Figure 1:
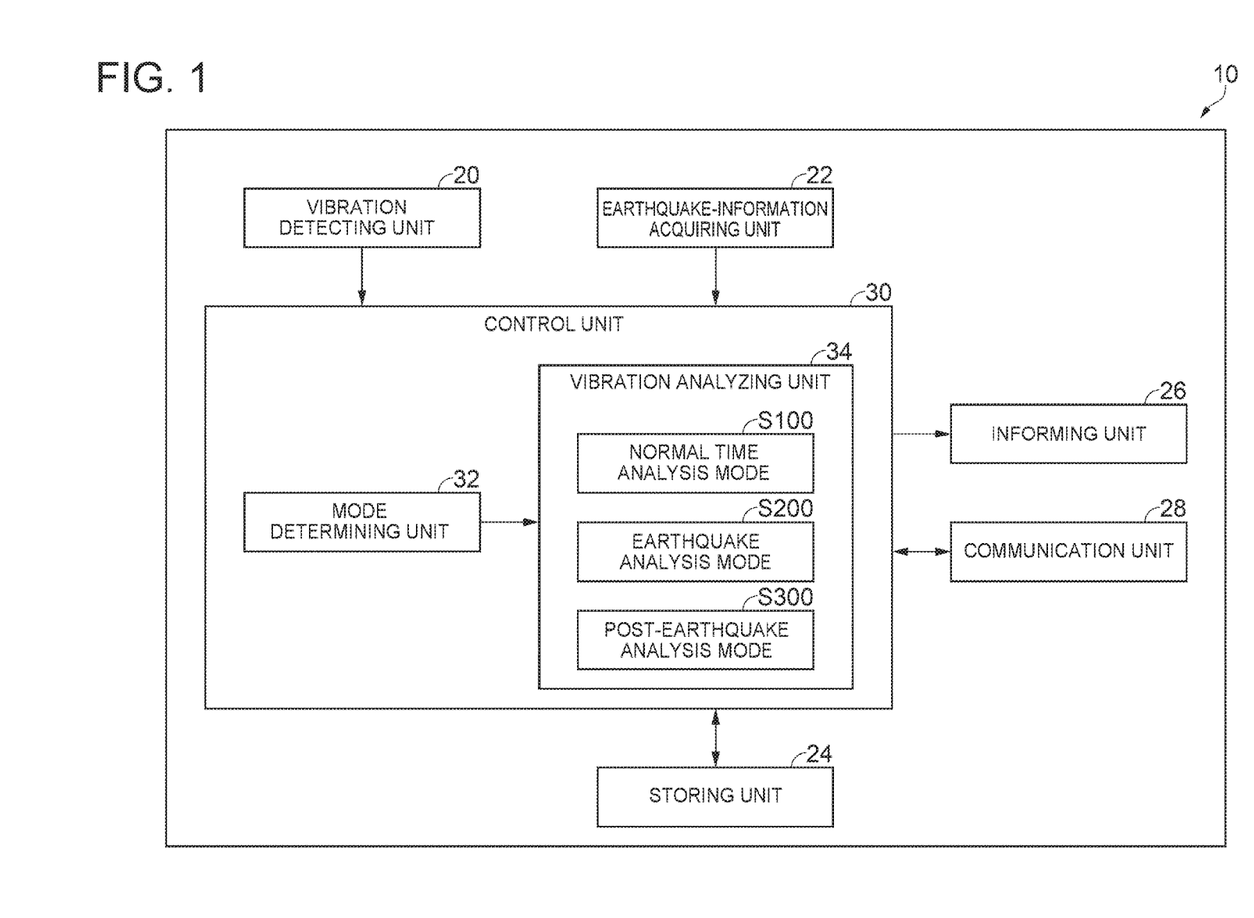
FIG. 1 is a block diagram showing a functional configuration of a vibration analyzing apparatus according to an embodiment.

FIG. 1 is a block diagram showing a functional configuration of a vibration analyzing apparatus 10 functioning as the vibration analyzing system. The vibration analyzing apparatus 10 is set in a pillar or a beam of a building functioning as a building structure. The vibration analyzing apparatus 10 has a function of detecting abnormality of the building during occurrence of an earthquake, abnormality of a person residing inside the building (referred to as resident), or an intruder into the building during absence of the resident and, when detecting the abnormality, notifying the abnormality to the outside. The vibration analyzing apparatus 10 includes a vibration detecting unit 20, an earthquake-information acquiring unit 22, a control unit 30, a storing unit 24, an informing unit 26, and a communication unit 28.

Figure 2:
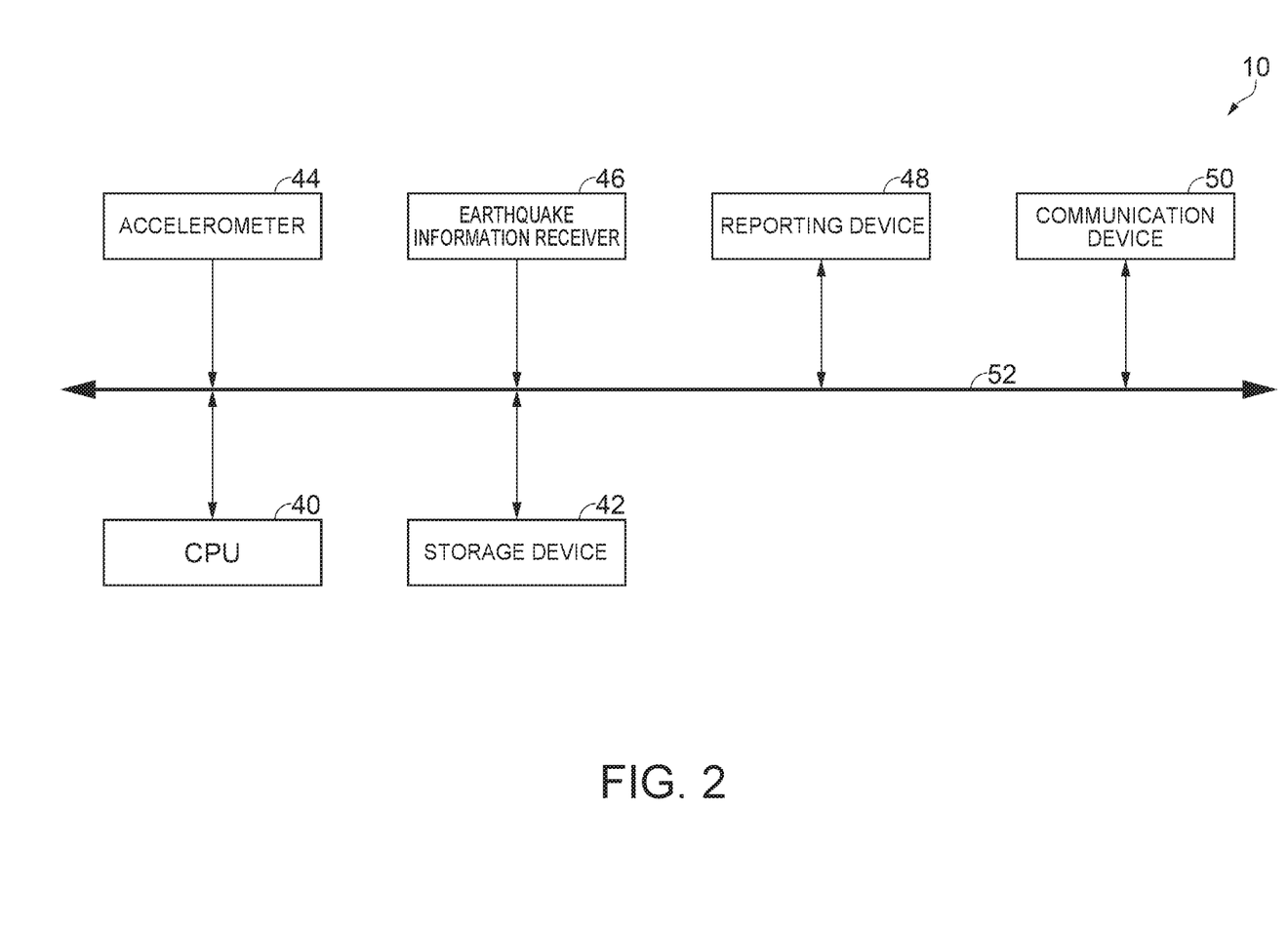
FIG. 2 is a diagram showing a hardware configuration of the vibration analyzing apparatus.

FIG. 2 is a diagram showing a hardware configuration of the vibration analyzing apparatus 10. The vibration analyzing apparatus 10 includes, as hardware, an accelerometer 44, an earthquake information receiver 46, a reporting device 48, a communication device 50, a CPU 40, and a storage device 42. These components are connected to be capable of exchanging signals with one another via a bus 52.

Note that, although not shown in the figure, the vibration analyzing apparatus 10 can be driven by a battery power supply in addition to a commercial power supply and is configured to be driven by the battery power supply even when a disaster occurs.

The vibration detecting unit 20 detects vibration and outputs vibration information concerning the detected vibration to the control unit 30. In this embodiment, the accelerometer 44 such as an acceleration sensor measures acceleration and applies predetermined signal processing to the measured acceleration to thereby generate vibration information (a detection signal) concerning the vibration. Note that the accelerometer 44 may be incorporated in the vibration analyzing apparatus 10 or may be separate from the vibration analyzing apparatus 10.

The vibration analyzing apparatus 10 may include a plurality of vibration detecting units 20. For example, when the vibration detecting units 20 are disposed as a pair in pillars present at diagonal corners of the building, since similar vibration waveforms are expected, it is easy to determine erroneous detection. When the vibration detecting units 20 are disposed in the pillar and the beam, it is possible to detect three-dimensional deformation of the building. When the vibration detecting units 20 are disposed in the foundation, the pillar, and the beam, it is possible to detect adhesion and destruction of the ground and the building.

The accelerometer 44 may include a low-power consumption acceleration sensor such as an Si-MEMS sensor and a high-accuracy acceleration sensor of a crystal vibration type. The accelerometer 44 may switch the acceleration sensors according to analysis modes explained below or may switch a gain for detecting vibration.

When an earthquake occurs, the earthquake-information acquiring unit 22 acquires earthquake information concerning the earthquake and outputs the acquired earthquake information to the control unit 30. In this embodiment, when the earthquake information receiver 46 receives a predetermined broadcast radio wave and receives an emergency earthquake news flash or the like broadcasted when an earthquake occurs, the earthquake-information acquiring unit 22 generates earthquake information on the basis of the received news flash.

The storing unit 24 stores data output from the control unit 30 and outputs the stored data to the control unit 30 according to a request from the control unit 30. In this embodiment, the storage device 42 such as a flash memory or a hard disk is assumed. However, the storage device 42 is not limited to the flash memory and the hard disk.

The informing unit 26 outputs and informs information to the outside on the basis of alarm data output from the control unit 30. In this embodiment, the alarm data is data for notifying abnormality of the building and abnormality of the resident of the building. The reporting device 48 informs the alarm data to people present inside and around the building with flashing of light, voice, buzzer sound, or the like.

The communication unit 28 transmits transmission data output from the control unit 30 to the outside. In this embodiment, the communication device 50 is connected to a network via a cellular phone line or a wireless LAN and performs communication with a predetermined external apparatus connected to the network, for example, a server apparatus, an information processing terminal, or a multi-function cellular phone. Note that the transmission data may be vibration information or may be data for notifying abnormality of the building and the resident. As a communication partner, another vibration analyzing apparatus 10 can also be assumed.

The control unit 30 controls the functions of the functional units explained above. The control unit 30 includes a mode determining unit 32 and a vibration analyzing unit 34.

The mode determining unit 32 determines, on the basis of the vibration information output from the vibration detecting unit 20 and the earthquake information output from the earthquake-information acquiring unit 22, a mode for an analysis in the vibration analyzing unit 34 and instructs the vibration analyzing unit 34 to switch an analysis mode to the determined mode. Note that the mode determining unit 32 is equivalent to an earthquake-vibration determining unit that determines presence or absence of vibration of the building caused by an earthquake.

The vibration analyzing unit 34 is an analyzing unit that switches the analysis mode and analyzes vibration on the basis of the mode switching instruction from the mode determining unit 32. In this embodiment, as modes that can be switched by the vibration analyzing unit 34, a normal time analysis mode S100 (FIG. 4), an earthquake analysis mode S200 (FIG. 5), and a post-earthquake analysis mode S300 (FIG. 6) are assumed.

Figure 4:
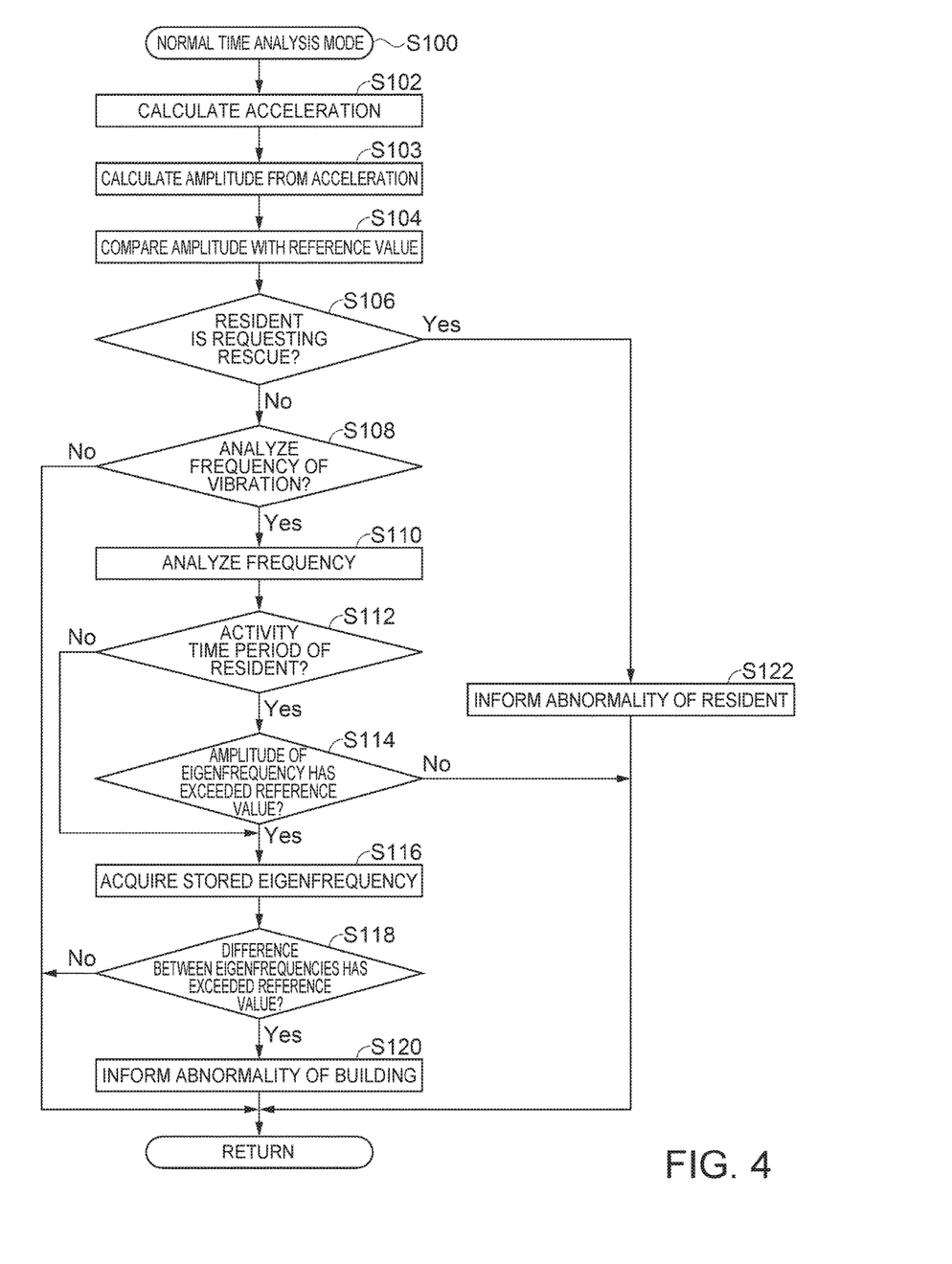
FIG. 4 is a flowchart for explaining a flow of analysis processing by a normal time analysis mode.

The normal time analysis mode S100 is an analysis mode selected at normal time when an earthquake does not occur. In the normal time analysis mode S100, a vibration waveform indicated by a detection signal is analyzed on the basis of a first condition. That is, in the normal time analysis mode S100, after the vibration detecting unit 20 is set, information concerning residence of the person is obtained on the basis of information obtained by storing and analyzing vibration waveforms due to life activities (walking, door and window opening and closing, and simulated fall) of the resident in a collection mode for information for analysis determination. The information is information for determining walking vibration, door opening and closing vibration, and fall vibration (abnormal situations) of the person residing in the building, outsider intrusion vibration, and the like. The normal time analysis mode S100 is equivalent to a first analysis mode.

Figure 5:
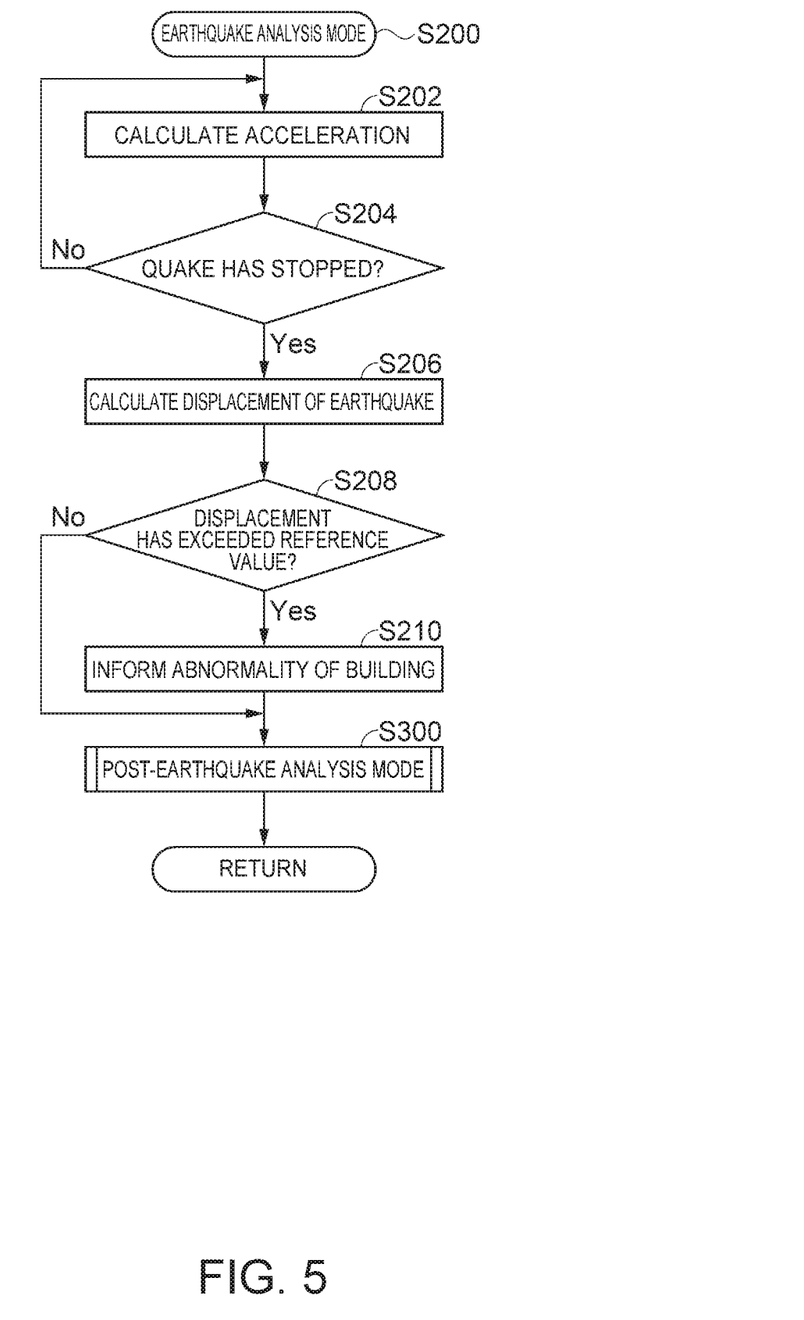
FIG. 5 is a flowchart for explaining a flow of analysis processing by an earthquake time mode.

The earthquake analysis mode S200 is an analysis mode selected when an earthquake occurs. In the earthquake analysis mode S200, an earthquake waveform included in a vibration waveform is analyzed to obtain information concerning deformation of the building. The deformation of the building includes evaluation values (estimated values) concerning quake width, quake speed, the number of times of quakes, and deformation (deterioration in structure) due to the quake width, the quake speed, and the number of times of quakes of the building. The earthquake analysis mode S200 is equivalent to a second analysis mode.

Figure 6:
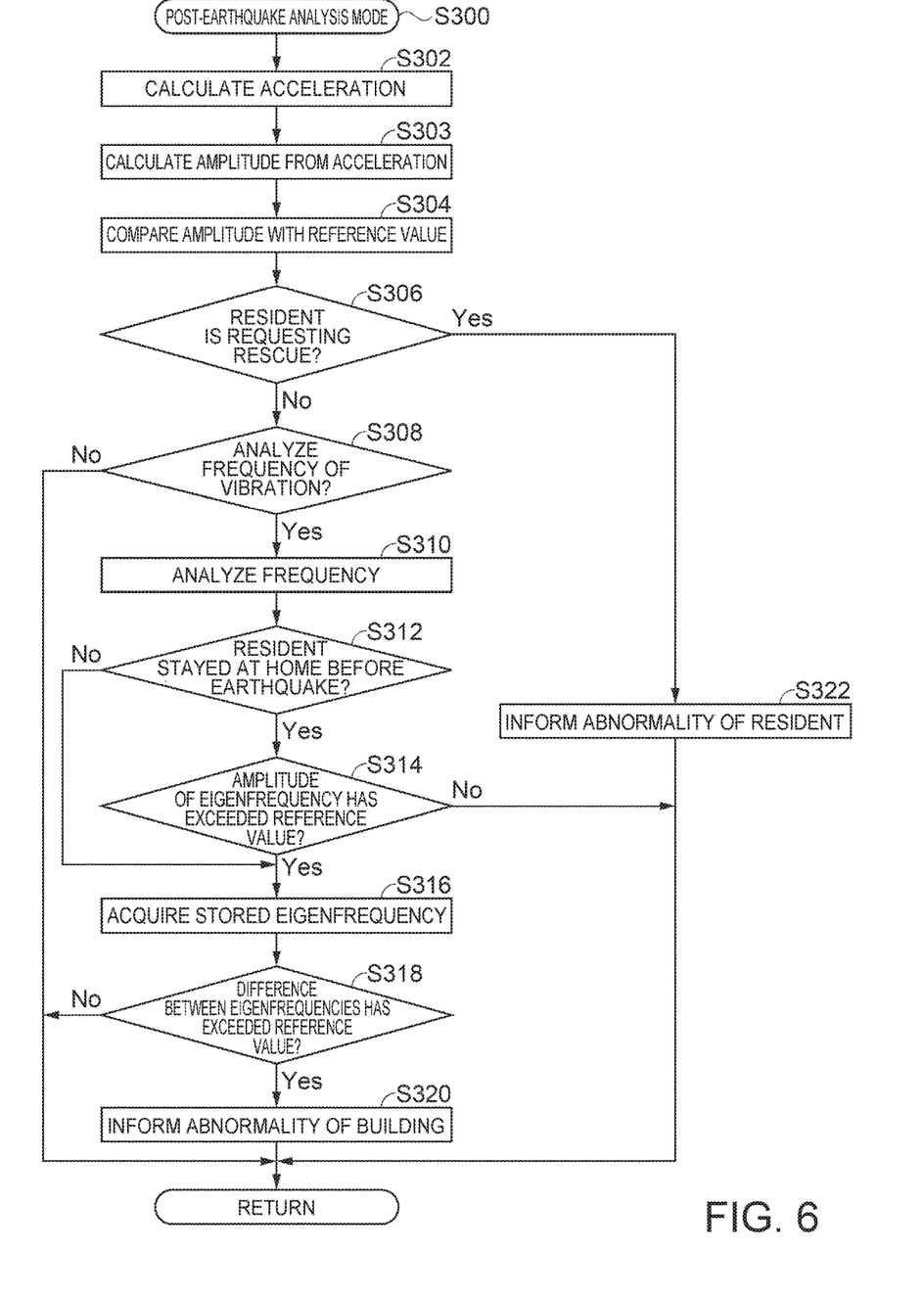
FIG. 6 is a flowchart for explaining a flow of analysis processing by a post-earthquake analysis mode.

The post-earthquake analysis mode S300 is equivalent to a third analysis mode and is an analysis mode selected after the earthquake analysis mode S200 is executed. In the post-earthquake analysis mode S300, a vibration waveform indicated by a detection signal is analyzed on the basis of a second condition. Note that details of processing in the respective modes are explained below.

The vibration analyzing unit 34 stores data obtained by the analyses in the respective modes in the storing unit 24 according to necessity and generates alarm data and transmission data according to an analysis result.

In this embodiment, the control unit 30 indicates a functional configuration realized by cooperation of hardware such as the CPU 40 and the storage device 42 and software stored in the storage device 42. A specific implementation form is not particularly limited. Therefore, hardware individually corresponding to the functional units does not always need to be implemented. It is also naturally possible that one processor executes computer programs to realize functions of a plurality of functional units.

In the embodiment, a part of the functions realized by the software may be realized by the hardware. A part of the functions realized by the hardware may be realized by the software.

Figure 3:
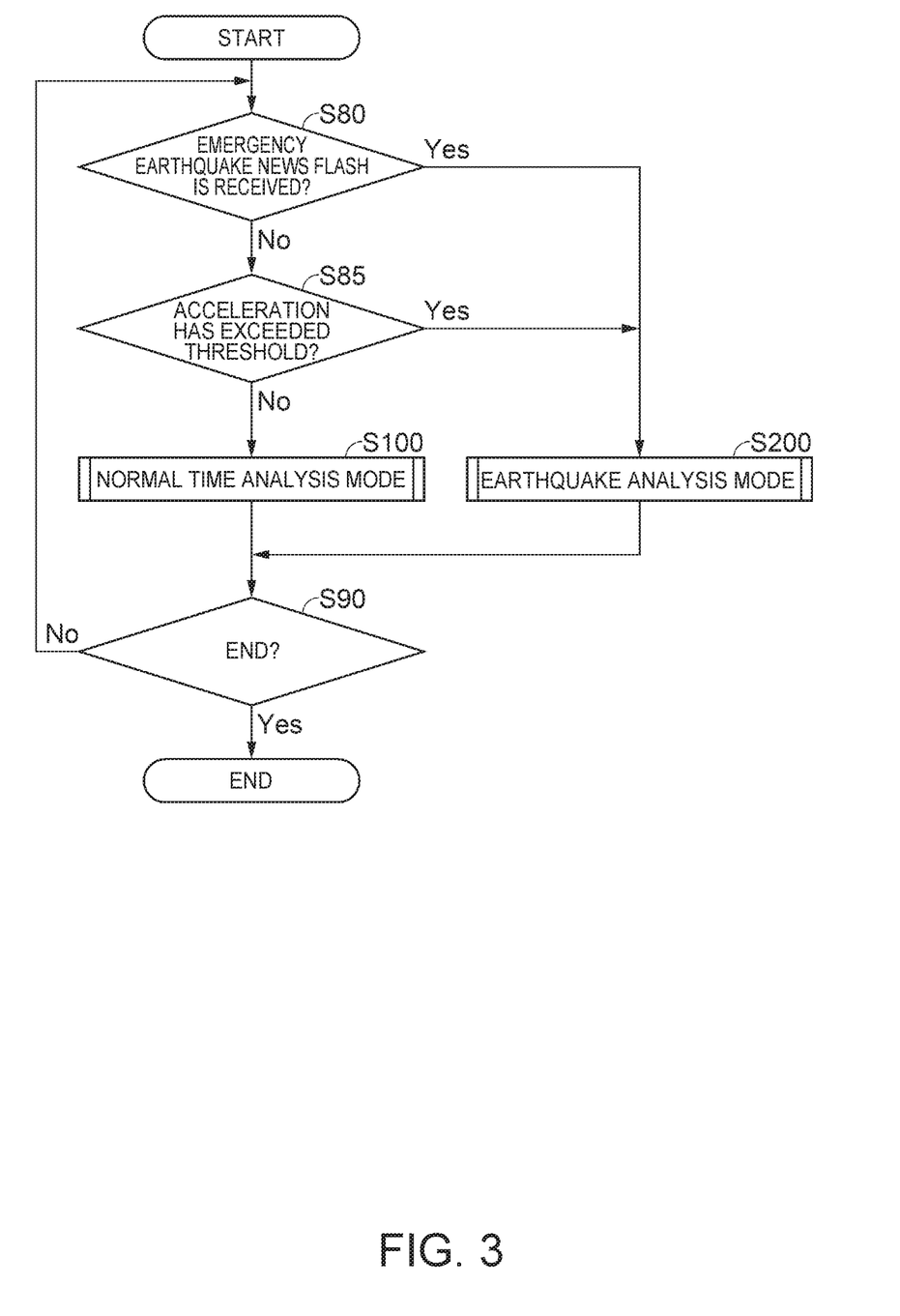
FIG. 3 is a flowchart for explaining a flow of vibration analysis processing.

FIG. 3 is a flowchart for explaining a flow of vibration analysis processing (a vibration analyzing method) in which the control unit 30 analyzes vibration. When the processing is started, the control unit 30 determines whether the earthquake information receiver 46 has received an emergency earthquake news flash (step S80).

When determining that the earthquake information receiver 46 has received the emergency earthquake news flash (Yes in step S80), the control unit 30 executes the vibration analysis by the earthquake analysis mode S200 and proceeds to step S90.

On the other hand, when determining that the earthquake information receiver 46 has not received the emergency earthquake news flash (No in step S80), the control unit 30 determines whether acceleration detected by the accelerometer 44 has exceeded a predetermined threshold (step S85). Note that the predetermined threshold is, for example, acceleration corresponding to an earthquake that is likely to cause damage because, for example, a seismic center is close, although the emergency earthquake news flash is not broadcasted.

When determining that the detected acceleration has exceeded the predetermined threshold (Yes in step S85), the control unit 30 executes the vibration analysis by the earthquake analysis mode S200 (FIG. 5) and proceeds to step S90.

On the other hand, when determining that the detected acceleration has not exceeded the predetermined threshold (No in step S85), the control unit 30 executes the vibration analysis by the normal time analysis mode S100 (FIG. 4) and proceeds to step S90.

In step S90, the control unit 30 determines whether to end the vibration analysis processing. When determining not to end the vibration analysis processing (No in step S90), the control unit 30 returns to step S80. On the other hand, when determining to end the vibration analysis processing (Yes in step S90), the control unit 30 ends the vibration analysis processing.

FIG. 4 is a flowchart for explaining a flow of analysis processing by the normal time analysis mode S100. When the processing is started, the control unit 30 calculates acceleration from the accelerometer 44 (step S102).

Subsequently, the control unit 30 performs a plurality of times of integral operation on the calculated acceleration to thereby calculate amplitude (step S103). Note that data of the acceleration and the amplitude is stored in the storage device 42.

Subsequently, the control unit 30 compares the calculated amplitude and a reference value (step S104). The reference value is equivalent to the first condition and is an amplitude pattern predicted to occur when the resident taps a pillar or the like or thrashes feet about inside the building. The vibration analyzing apparatus 10 may change the reference value on the basis of the number of residents or age and sex of the resident input to the vibration analyzing apparatus 10. The resident may determine the number of times, an interval, and strength of the tapping of the floor or the pillar at the time when the resident is caught between household goods or cannot move because of fracture due to a fall or the like of the resident and may create a determination pattern.

Subsequently, as a result of the comparison, when determining that the resident is requesting a rescue (Yes in step S106), the control unit 30 reports abnormality of the resident via the reporting device 48 or the communication device 50 (step S122) and ends the normal time analysis mode S100.

On the other hand, when determining that the resident is not requesting a rescue (No in step S106), the control unit 30 determines whether to analyze the frequency of vibration (step S108). In this embodiment, the control unit 30 analyzes the frequency of the vibration at a predetermined time interval. However, the analysis of the frequency of the vibration is not limited to this. The control unit 30 may always analyze the frequency of the vibration.

When determining not to analyze the frequency of the vibration (No in step S108), the control unit 30 ends the normal time analysis mode S100.

On the other hand, when determining to analyze the frequency of the vibration (Yes in step S108), the control unit 30 removes, with a low-pass filter, noise components from the calculated amplitude and the data of the amplitude stored in the storage device 42 and thereafter analyzes the frequency with the fast Fourier transform (step S110).

Subsequently, the control unit 30 determines on the basis of time information whether time is an activity time period when the resident is moving in the building (step S112).

When determining that the time is not the activity time period as in late at night or early in the morning (No in step S112), the control unit 30 proceeds to step S116.

On the other hand, when determining that the time is the activity time period (Yes in step S112), the control unit 30 determines whether the amplitude of eigenfrequency obtained by the FFT has exceeded the reference value (step S114).

When determining that the amplitude of the eigenfrequency has not exceeded the reference value (No in step S114), the control unit 30 ends the normal time analysis mode S100. Note that the control unit 30 may further analyze the amplitude of the eigenfrequency and determine on the basis of an analysis result whether the resident is requesting a rescue. When the resident is requesting a rescue, the control unit 30 may end the normal time analysis mode S100 after executing step S122.

On the other hand, when determining that the amplitude of the eigenfrequency has exceeded the reference value (Yes in step S114), the control unit 30 proceeds to step S116.

In step S116, the control unit 30 acquires the eigenfrequency stored in the storing unit 24.

Subsequently, the control unit 30 compares the eigenfrequency obtained by the FFT and the eigenfrequency stored in the storing unit 24 and determines whether a difference between the eigenfrequencies has exceeded a reference value (step S118). When determining that the difference between the eigenfrequencies has exceeded the reference value (Yes in step S118), the control unit 30 determines that a change has occurred in the structure of the building because of deformation due to decrepitude or the like of the building, an intruder into the building, breaking of window glass, or the like, reports abnormality of the building via the reporting device 48 or the communication device 50 (step S120), and ends the normal time analysis mode S100.

On the other hand, when determining that the difference between the eigenfrequencies has not exceeded the reference value (No in step S118), the control unit 30 ends the normal time analysis mode S100.

FIG. 5 is a flowchart for explaining a flow of analysis processing by the earthquake analysis mode S200. When the processing is started, the control unit 30 calculates acceleration from the accelerometer 44 (step S202).

Subsequently, the control unit 30 determines from the calculated acceleration whether the quake by the earthquake has stopped (step S204). When determining that the quake has not stopped (No in step S204), the control unit 30 returns to step S202.

On the other hand, when determining that the quake has stopped (Yes in step S204), the control unit 30 calculates a displacement of the earthquake from the acceleration (step S206).

Subsequently, the control unit 30 determines whether the calculated displacement has exceeded a reference value (step S208). When determining that the displacement has not exceeded the reference value (No in step S208), the control unit 30 proceeds to step S300.

On the other hand, when determining that the calculated displacement has exceeded the reference value (Yes in step S208), the control unit 30 informs that it is highly likely that abnormality has occurred in the structure of the building (step S210) and proceeds to step S300.

In step S300, the control unit 30 executes the post-earthquake analysis mode S300 for performing an analysis after the earthquake and ends the analysis processing by the earthquake analysis mode S200.

FIG. 6 is a flowchart for explaining a flow of analysis processing by the post-earthquake analysis mode S300. When the processing is started, the control unit 30 calculates acceleration from the accelerometer 44 (step S302).

Subsequently, the control unit 30 calculates amplitude from the calculated acceleration (step S303). Note that data of the acceleration and the amplitude is stored in the storage device 42.

Subsequently, the control unit 30 compares the calculated amplitude and a reference value (step S304). The reference value is equivalent to the second condition different from the first condition and is an amplitude pattern predicted to occur when the resident taps furniture, a pillar, or the like or thrashes feet about if the resident cannot move because of a collapse of furniture or the like due to an earthquake.

Subsequently, as a result of the comparison, when determining that the resident is requesting a rescue (Yes in step S306), the control unit 30 reports abnormality of the resident via the reporting device 48 or the communication device 50 (step S322) and ends the post-earthquake analysis mode S300.

On the other hand, when determining that the resident is not requesting a rescue (No in step S306), the control unit 30 determines whether to analyze the frequency of vibration (step S308). In this embodiment, the control unit 30 analyzes the frequency of the vibration in every predetermined time.

When determining not to analyze the frequency of the vibration (No in step S308), the control unit 30 ends the post-earthquake analysis mode S300.

On the other hand, when determining to analyze the frequency of the vibration (Yes in step S308), the control unit 30 removes, with a low-pass filter, noise components from the calculated amplitude and the data of the amplitude stored in the storage device 42 and thereafter analyzes the frequency with the fast Fourier transform (step S310).

Subsequently, the control unit 30 determines on the basis of the information stored in the storage device 42 whether the resident stayed at home before the earthquake occurred (step S312).

When determining that the resident was absent in the building (No in step S312), the control unit 30 proceeds to step S316.

On the other hand, when determining that the resident was present in the building (Yes in step S312), the control unit 30 determines whether the amplitude of eigenfrequency obtained by the FFT has exceeded a reference value (step S314).

When determining that the amplitude of the eigenfrequency has not exceeded the reference value (No in step S314), the control unit 30 ends the post-earthquake analysis mode S300.

On the other hand, when determining that the amplitude of the eigenfrequency has exceeded the reference value (Yes in step S314), the control unit 30 proceeds to step S316.

In step S316, the control unit 30 acquires the eigenfrequency before the earthquake stored in the storing unit 24.

Subsequently, the control unit 30 compares the eigenfrequency (a second eigenfrequency) obtained by the FFT and the eigenfrequency (a first eigenfrequency) before the earthquake stored in the storing unit 24 and determines whether a difference between the eigenfrequencies has exceeded a reference value (step S318). When determining that the difference between the eigenfrequencies has exceeded the reference value (Yes in step S318), the control unit 30 determines that a change occurs in the structure of the building because of deformation of the building due to the earthquake, an intruder into the building, or the like, reports abnormality of the building via the reporting device 48 or the communication device 50 (step S320), and ends the normal post-earthquake analysis mode S300.

On the other hand, when determining that the difference between the eigenfrequencies has not exceeded the reference value (No in step S318), the control unit 30 ends the post-earthquake analysis mode S300.

Note that the vibration analyzing apparatus 10 can be used alone, that is, as one apparatus. However, it is also possible to assume a form of a vibration analyzing system in which a plurality of vibration analyzing apparatuses are set in separated positions such as a foundation and a beam in the same building and associated. For example, a form is assumed in which one of the plurality of vibration analyzing apparatuses functions as a master and the other functions as slaves.

Figure 7:
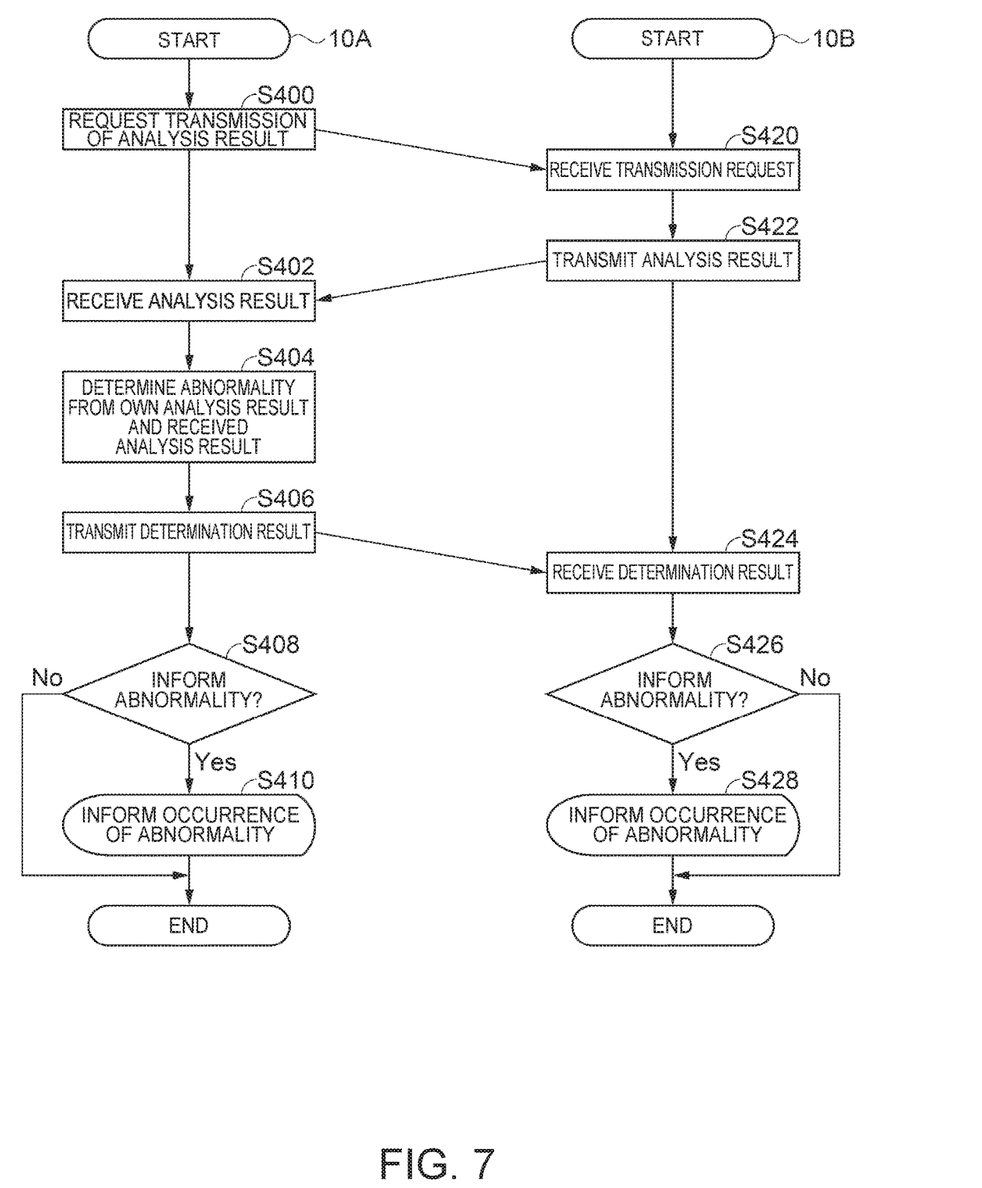
FIG. 7 is a diagram showing a flow of processing of vibration analyzing apparatuses functioning as a master and a slave.

FIG. 7 is a diagram showing a flow of processing in a vibration analyzing apparatus 10A functioning as a master and a vibration analyzing apparatus 10B functioning as a slave.

When the vibration analyzing apparatus 10A and the vibration analyzing apparatus 10B are respectively executing the vibration analysis processing shown in FIG. 3, in every predetermined time or when detecting some abnormality, the vibration analyzing apparatus 10A requests the vibration analyzing apparatus 10B to transmit an analysis result (step S400).

The vibration analyzing apparatus 10B receives the transmission request transmitted from the vibration analyzing apparatus 10A (step S420) and transmits an analysis result of the vibration analyzing apparatus 10B to the vibration analyzing apparatus 10A (step S422).

The vibration analyzing apparatus 10A receives the analysis result transmitted from the vibration analyzing apparatus 10B (step S402).

Subsequently, the vibration analyzing apparatus 10A determines abnormality on the basis of an analysis result of the vibration analyzing apparatus 10A and the analysis result of the vibration analyzing apparatus 10B (step S404).

For example, in the normal time analysis mode S100, the vibration analyzing apparatus 10A may confirm that a difference between amplitude calculated from acceleration by the vibration analyzing apparatus 10A and amplitude calculated by the vibration analyzing apparatus 10B is equal to or smaller than a fixed value, calculate an average of the amplitude when the difference is equal to or smaller than the fixed value, and compare the calculated average and the reference value used in step S104 to determine abnormality occurrence.

Consequently, when the vibration detecting unit 20 of the vibration analyzing apparatus 10A or the vibration analyzing apparatus 10B erroneously detects vibration, it is possible to suppress erroneous determination. In addition, by calculating the average of the amplitude, it is possible to achieve improvement of determination accuracy. Similarly, in step S118, it is also possible to assume a form in which an average of eigenfrequencies of a plurality of apparatuses to achieve suppression of erroneous determination and improvement of accuracy concerning building abnormality.

Subsequently, the vibration analyzing apparatus 10A transmits a determination result to the vibration analyzing apparatus 10B (step S406).

The vibration analyzing apparatus 10A determines on the basis of the determination result whether to inform the abnormality (step S408). When determining not to inform the abnormality (No), the vibration analyzing apparatus 10A ends the processing without performing anything. When determining to inform the abnormality (Yes), the vibration analyzing apparatus 10A informs the occurrence of the abnormality (step S410) and ends the processing.

The vibration analyzing apparatus 10B receives the determination result (step S424) and determines on the basis of the received determination result whether to inform the abnormality (step S426). When determining not to inform the abnormality (No), the vibration analyzing apparatus 10B ends the processing without doing anything. When determining to inform the abnormality (Yes), the vibration analyzing apparatus 10B informs the occurrence of the abnormality (step S428) and ends the processing.

In this way, when it is determined that the abnormality has occurred, the occurrence of the abnormality is informed from the vibration analyzing apparatus 10A and the vibration analyzing apparatus 10B. Therefore, it is possible to surely and extensively notify the abnormality occurrence to the outside.

According to the embodiment explained above, effects explained below are achieved.

(1) In a normal state, the vibration analyzing apparatus 10 set in the building analyzes a vibration waveform on the basis of vibration detected by the vibration detecting unit 20 to thereby detect abnormality of the building and abnormality of the resident of the building. When the earthquake-information acquiring unit 22 acquires occurrence of an earthquake, by switching the analysis mode, the vibration analyzing apparatus 10 analyzes an earthquake waveform on the basis of the vibration detected by the vibration detecting unit 20 and detects the abnormality of the building. Therefore, it is possible to quickly and easily perform, with the vibration analyzing apparatus 10, monitoring of life activities of the resident and damage monitoring of the building during the earthquake occurrence.

(2) After the earthquake occurrence, the vibration analyzing apparatus 10 analyzes the abnormality of the building due to the earthquake and thereafter analyzes the vibration to determine whether the resident is requesting a rescue. When the resident is requesting a rescue, the vibration analyzing apparatus 10 informs the abnormality of the resident to the outside. Therefore, it is possible to quickly request a rescue of the resident confined in the building by the earthquake.

(3) The vibration analyzing apparatus 10 can detect intrusion by an intruder, breaking of window glass, and the like by analyzing a vibration waveform in the normal state. Therefore, it is possible to prevent crimes.

The invention is explained above on the basis of the embodiment shown in the figures. However, the invention is not limited to the embodiment. Modifications explained below can also be assumed.

(1) When vibration is analyzed by a plurality of vibration analyzing apparatuses 10, a server apparatus connected via the communication unit 28 may transmit an analysis instruction to the vibration analyzing apparatuses 10 and analyze analysis results of the vibration analyzing apparatuses 10 to determine abnormality.

(2) The vibration analyzing apparatus 10 may include a plurality of vibration detecting units 20. For example, when the vibration detecting units 20 are disposed as a pair in the pillars present at the diagonal corners of the building, since similar vibration waveforms are expected, it is easy to determine erroneous detection. When the vibration detecting units 20 are disposed in the pillar and the beam, it is possible to detect three-dimensional deformation of the building. When the vibration detecting units 20 are disposed in the foundation, the pillar, and the beam, it is possible to detect adhesion and destruction of the ground and the building.

(3) The plurality of vibration analyzing apparatuses 10 may be respectively set in different buildings. For example, it is also possible that a master system set by a municipality for a certain region and a slave system for each individual home are communicable and the master system performs building damage determination in the entire region. In this case, the vibration analyzing apparatus 10A functioning as the master system may acquire an analysis result from the other vibration analyzing apparatus 10B functioning as the slave system and perform an analysis of vibration including determination whether the analysis is an erroneous analysis using averages of analysis results (acceleration amplitude values, event occurrence time intervals, maximum speeds, and maximum displacements concerning a vibration event of the building determined as identical) of the plurality of vibration analyzing apparatuses 10 and using difference values of other analysis results (acceleration waveforms, speed waveforms, and displacement waveforms from the same start time concerning a vibration event of the building determined as identical).

The entire disclosure of Japanese Patent Application No. 2015-256062 filed Dec. 28, 2015 is expressly incorporated by reference herein.

What is claimed is:

1. A vibration analyzing system comprising:
   a vibration detecting unit set in a building and configured to detect vibration and output a detection signal based on the detected vibration;
   an earthquake-vibration determining unit configured to determine presence or absence of vibration of the building caused by an earthquake; and
   a control unit including an analyzing unit configured to analyze the vibration on the basis of the detection signal, the control unit setting an analysis mode of the analyzing unit, wherein
   the control unit sets one analysis mode on the basis of the presence or absence of the vibration due to the earthquake determined by the earthquake-vibration determining unit from a plurality of analysis modes including a first analysis mode for causing the analyzing unit to analyze a vibration waveform indicated by the detection signal on the basis of a first condition and obtaining information concerning residence of the person and a second analysis mode for causing the analyzing unit to analyze the vibration waveform and obtaining information concerning deformation of the building.

2. The vibration analyzing system according to claim 1, further comprising an earthquake-information acquiring unit configured to acquire earthquake information concerning the earthquake, wherein
   the earthquake-vibration determining unit determines presence or absence of earthquake vibration on the basis of the earth information.

3. The vibration analyzing system according to claim 2, wherein the control unit sets the second analysis mode when the earthquake information is acquired.

4. The vibration analyzing system according to claim 1, wherein, in the first analysis mode, at least one of abnormality of the building and abnormality of the person residing in the building is detected on the basis of the analysis of the vibration waveform.

5. The vibration analyzing system according to claim 1, wherein, in the second analysis mode, deterioration in structure of the building is detected on the basis of the analysis of the vibration waveform.

6. The vibration analyzing system according to claim 1, wherein, after setting the second analysis mode, the control unit causes the analyzing unit to analyze the vibration waveform on the basis of a second condition and sets a third analysis mode for detecting at least one of abnormality of the building, deterioration in structure of the building, and abnormality of the person residing in the building.

7. The vibration analyzing system according to claim 4, further comprising an informing unit configured to inform the abnormality of the building and the abnormality of the person residing in the building detected by the analyzing unit.

8. The vibration analyzing system according to claim 5, further comprising an informing unit configured to inform the deterioration in the structure of the building detected by the analyzing unit.

9. The vibration analyzing system according to claim 1, wherein, in the first analysis mode, the vibration waveform is analyzed at a predetermined time interval.

10. The vibration analyzing system according to claim 6, further comprising a storing unit configured to store an analysis result concerning the vibration, wherein
    the analyzing unit analyzes, in the first analysis mode, a first eigenfrequency of the building on the basis of the vibration waveform and stores the analyzed first eigenfrequency in the storing unit and analyzes, in the third analysis mode, a second eigenfrequency of the building on the basis of the vibration waveform, compares the analyzed second eigenfrequency and the first eigenfrequency stored in the storing unit, and detects deterioration in structure of the building.

11. The vibration analyzing system according to claim 1, wherein
the vibration analyzing system includes a plurality of the vibration detecting units, and
the control unit causes the analyzing unit to analyze the detection signals respectively output by the plurality of vibration detecting units and determines erroneous detection of the vibration on the basis of a plurality of the analysis results.

12. The vibration analyzing system according to claim 11, wherein the control unit calculates an average of the plurality of analysis results and determines occurrence of abnormality due to the vibration on the basis of the calculated average.

13. A vibration analyzing apparatus comprising:
a vibration detecting unit set in a building and configured to detect vibration and output a detection signal based on the detected vibration;
an earthquake-vibration determining unit configured to determine presence or absence of vibration of the building caused by an earthquake; and
a control unit including an analyzing unit configured to analyze the vibration on the basis of the detection signal, the control unit setting an analysis mode of the analyzing unit, wherein
the control unit sets one analysis mode on the basis of the presence or absence of the vibration due to the earthquake determined by the earthquake-vibration determining unit from a plurality of analysis modes including a first analysis mode for causing the analyzing unit to analyze a vibration waveform indicated by the detection signal on the basis of a first condition and obtaining information concerning residence of the person and a second analysis mode for causing the analyzing unit to analyze the vibration waveform and obtaining information concerning deformation of the building.

14. A vibration analyzing method comprising:
detecting vibration of a building and outputting a detection signal based on the detected vibration;
determining presence or absence of vibration of the building caused by an earthquake; and
setting one analysis mode on the basis of the presence or absence of the vibration due to the earthquake from a plurality of analysis modes including a first analysis mode for analyzing a vibration waveform indicated by the detection signal on the basis of a first condition and obtaining information concerning residence of the person and a second analysis mode for analyzing the vibration waveform and obtaining information concerning deformation of the building.

* * * * *